United States Patent
Tai et al.

(10) Patent No.: US 8,098,238 B2
(45) Date of Patent: Jan. 17, 2012

(54) HANDHELD ELECTRONIC APPARATUS AND INPUT DEVICE THEREOF

(75) Inventors: Chih Wei Tai, Taoyuan (TW); Chung Yuan Ou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 952 days.

(21) Appl. No.: 12/051,398

(22) Filed: Mar. 19, 2008

(65) Prior Publication Data

US 2009/0066661 A1 Mar. 12, 2009

(30) Foreign Application Priority Data

Sep. 12, 2007 (TW) .............................. 96133986 A

(51) Int. Cl.
*G06F 3/041* (2006.01)

(52) U.S. Cl. ..... 345/173; 345/156; 345/169; 178/18.01; 178/18.03; 200/5; 200/512; 455/566.2; 455/575.1; 361/679.15

(58) Field of Classification Search ................. 345/156, 345/173, 168–169, 172; 178/18.01, 18.03, 178/19.01, 20.01; 463/37, 38; 200/5, 512; 455/556, 556.2, 575.1; 361/679.3, 679.15
See application file for complete search history.

(56) References Cited

U.S. PATENT DOCUMENTS

| 5,521,345 | A * | 5/1996 | Wulc .............................. 200/317 |
| 2005/0052425 | A1 | 3/2005 | Zadesky et al. |
| 2006/0181517 | A1 | 8/2006 | Zadesky et al. |
| 2006/0197714 | A1* | 9/2006 | Chang ............................ 345/1.1 |
| 2006/0250377 | A1 | 11/2006 | Zadesky et al. |
| 2007/0015554 | A1* | 1/2007 | Siddiqui et al. ............ 455/575.7 |
| 2007/0052691 | A1 | 3/2007 | Zadesky et al. |
| 2007/0103453 | A1* | 5/2007 | Choo et al. ..................... 345/173 |
| 2007/0215451 | A1* | 9/2007 | Sasloff et al. ................. 200/600 |

FOREIGN PATENT DOCUMENTS

| TW | 264941 | 12/1995 |
| TW | 360409 | 6/1999 |
| TW | I232364 | 5/2005 |
| TW | I273467 | 2/2007 |

* cited by examiner

*Primary Examiner* — Lun-Yi Lao
*Assistant Examiner* — Insa Sadio
(74) *Attorney, Agent, or Firm* — Connolly Bove Lodge & Hutz LLP

(57) ABSTRACT

A handheld electronic apparatus comprises a touch keypad, a circuit board, a base and a support mechanism. The touch keypad is configured to receive a user's touch operation and comprises a plurality of icons. The circuit board is placed below the touch keypad and has a dome switch providing tactile feedback to the user when the user presses the touch keypad. The base is placed between the touch keypad and the circuit board and has a first opening through which the touch keypad can trigger the dome switch. The support mechanism is placed between the touch keypad and the base to support the touch keypad.

16 Claims, 6 Drawing Sheets

HANDHELD ELECTRONIC APPARATUS AND INPUT DEVICE THEREOF

BACKGROUND OF THE INVENTION (A) Field of the Invention

The present invention is related to an electronic apparatus, and more specifically, to a handheld electronic apparatus and an input device thereof.

(B) Description of Related Art

LG's famous "Chocolate" phone of model no. KG800, which is widely sold around the world, uses a touch keypad as a user interface. This provides a brand new feeling in communication. Although such touch keypad has become a trend for interfaces of electronic displays, it has no recovery mechanism after being pressed. As a consequence, users who are used to the tactile feeling of hand pressing may not confirm whether the instruction is inputted, or may feel uncomfortable due to lack of actual pressing.

SUMMARY OF THE INVENTION

The present invention provides a handheld electronic apparatus and an input device thereof offering real tactile feedback similar to that of traditional keys.

The present invention provides a handheld electronic apparatus comprising a touch keypad, a circuit board, a base and a support mechanism. The touch keypad has a plurality of icons and is configured to receive the user's touch operation. The circuit board has a dome switch and is placed below the touch keypad. The keypad moves to press the dome switch. The base is placed between the touch keypad and the circuit board, and has a first opening through which the touch keypad triggers the dome switch. The support mechanism is placed between the touch keypad and the base to support the touch keypad.

The present invention provides an input device for a handheld electronic apparatus having a base with a first opening. The input device comprises a touch keypad, a circuit board and a support mechanism. The touch keypad has a plurality of icons and is configured to receive the user's touch operation. The circuit board has a dome switch and is placed below the touch keypad. The keypad moves to press the dome switch. The base is placed between the touch keypad and the circuit board, and has the first opening through which the touch keypad triggers the dome switch. The support mechanism is placed between the touch keypad and the base to support the touch keypad.

The input device forms the tactile feedback mechanism, which can be combined as a kit for application to a wide variety of electronic apparatuses.

DETAILED DESCRIPTION OF THE INVENTION

The present invention provides a handheld electronic apparatus, and an input device for providing a tactile feedback mechanism. Therefore, in addition to experiencing brand new functions of the input device, the user can feel real tactile feedback like that provided by traditional keys.

First Embodiment

Figure 1:
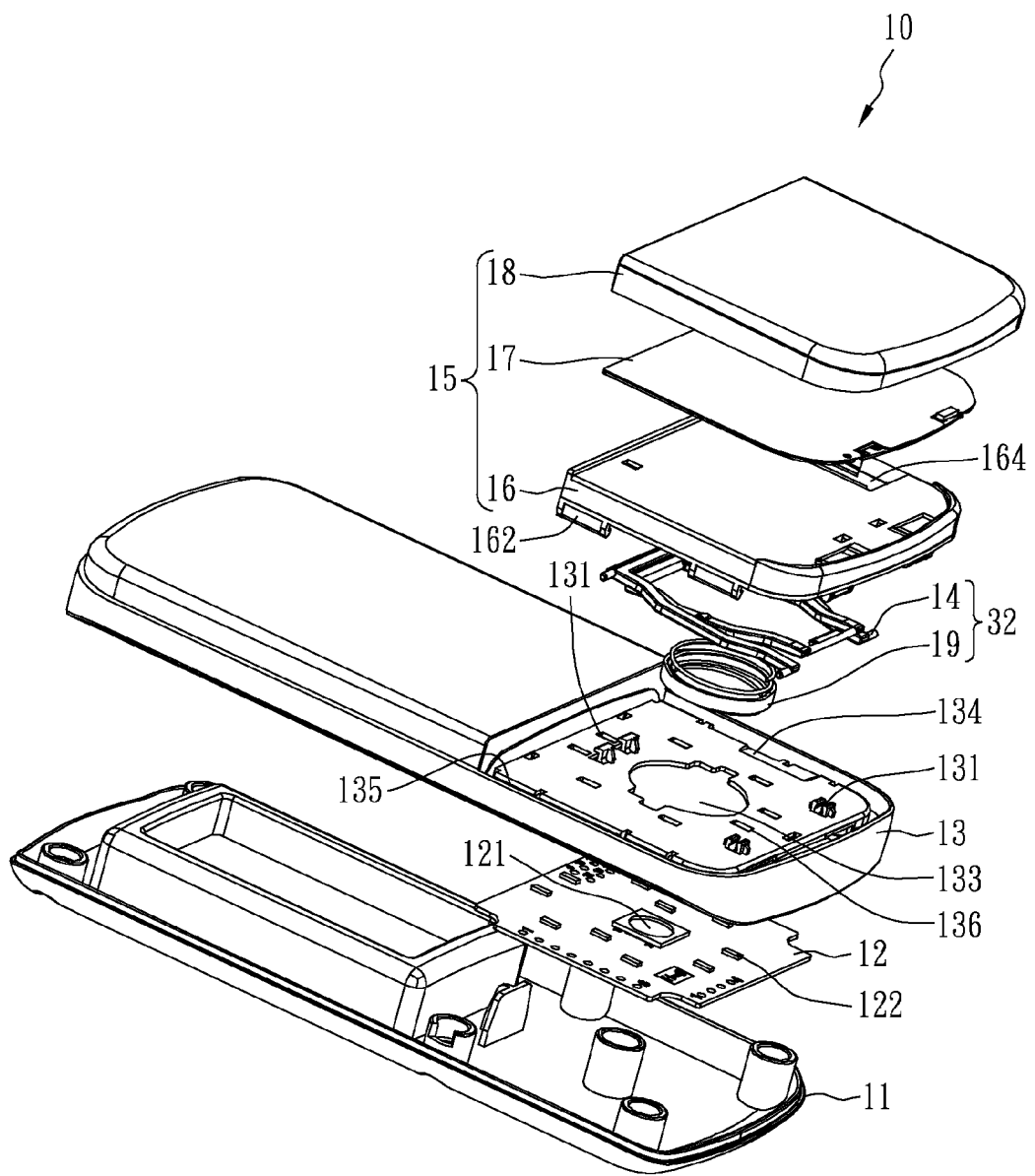
FIG. 1 and FIG. 2 are exploded perspective views of the handheld electronic apparatus of the first embodiment of the present invention.
Figure 2:
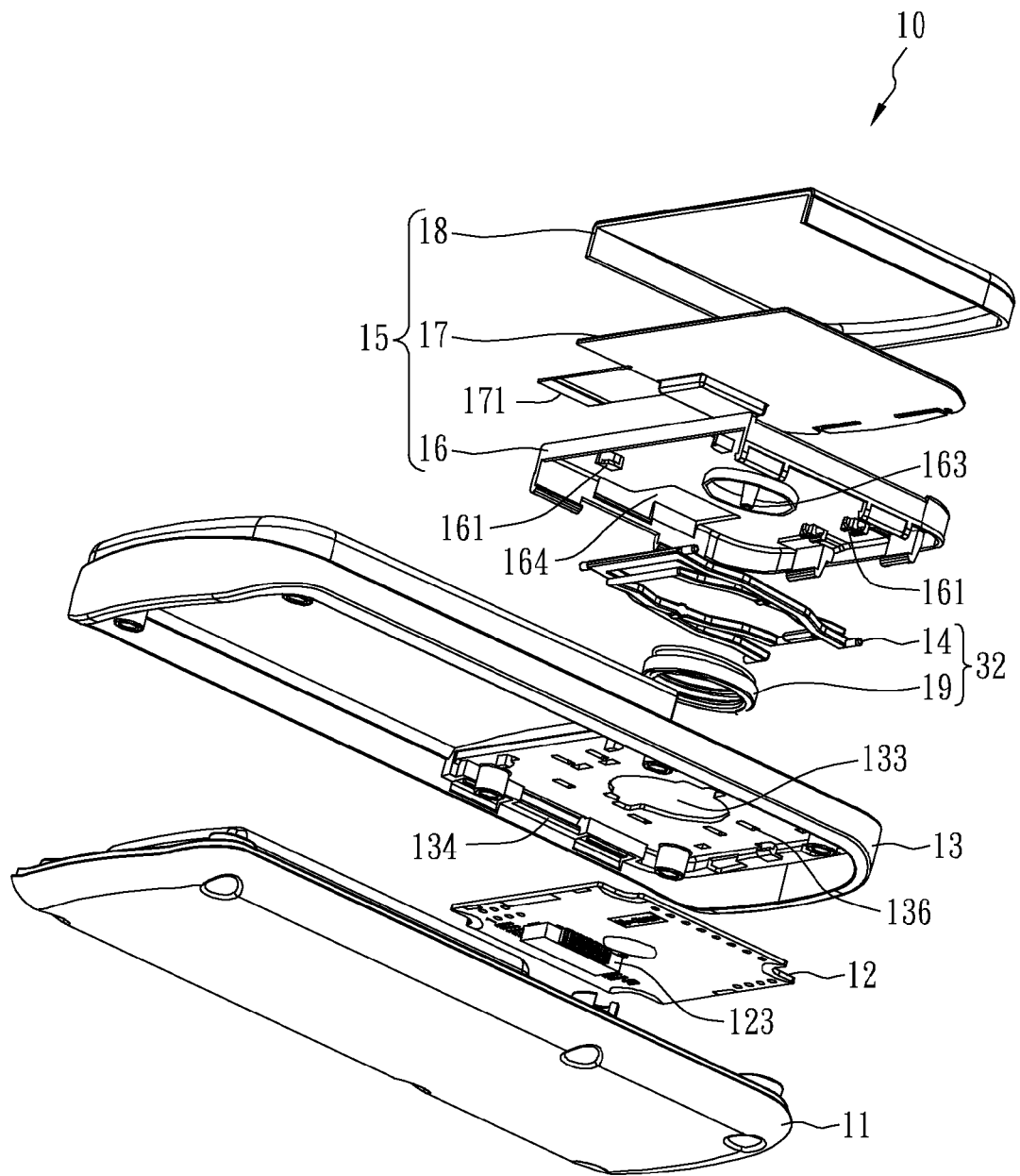
Figure 7:
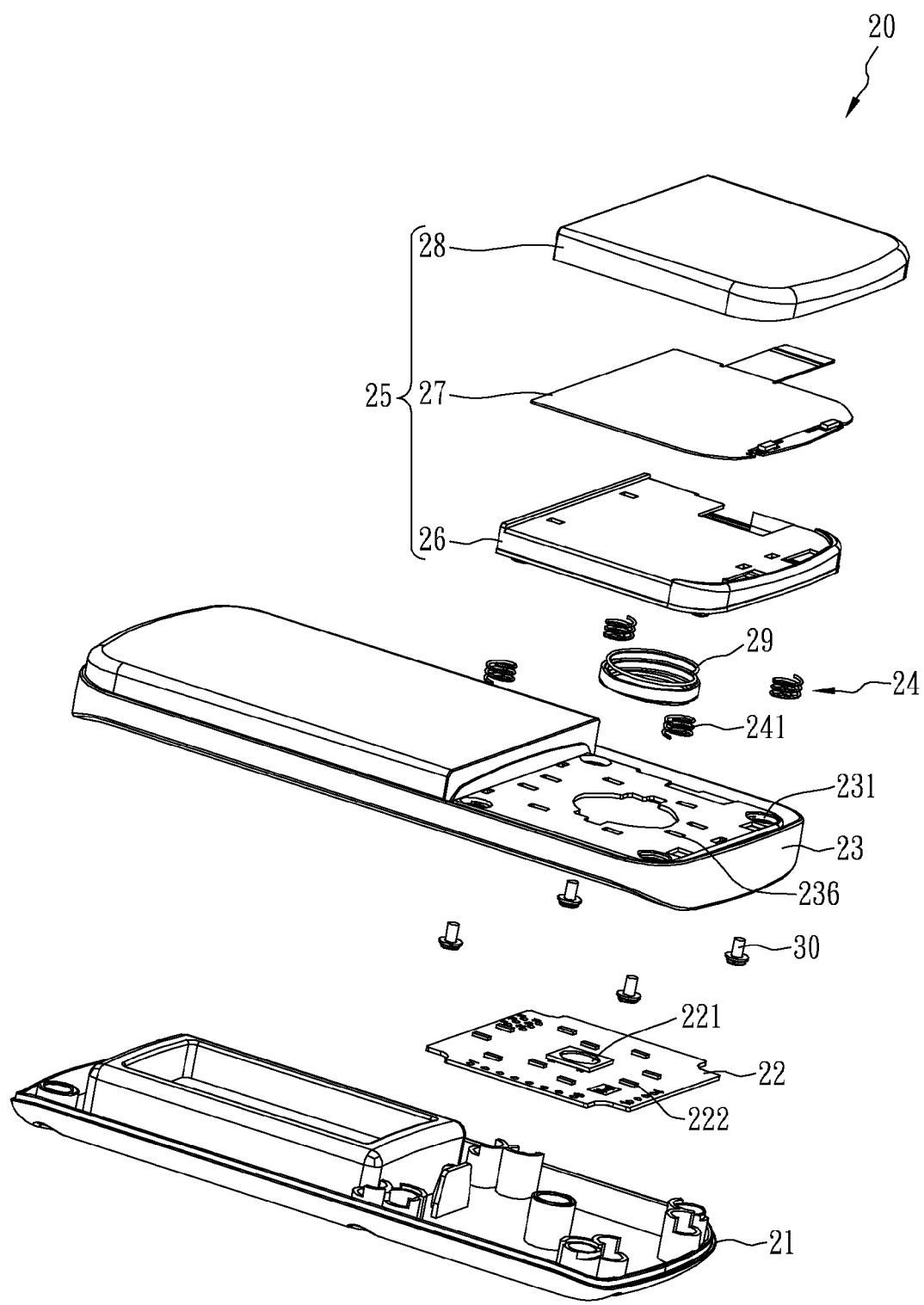
FIG. 7 and FIG. 8 are exploded perspective views of the handheld electronic apparatus of the second embodiment of the present invention.
Figure 8:
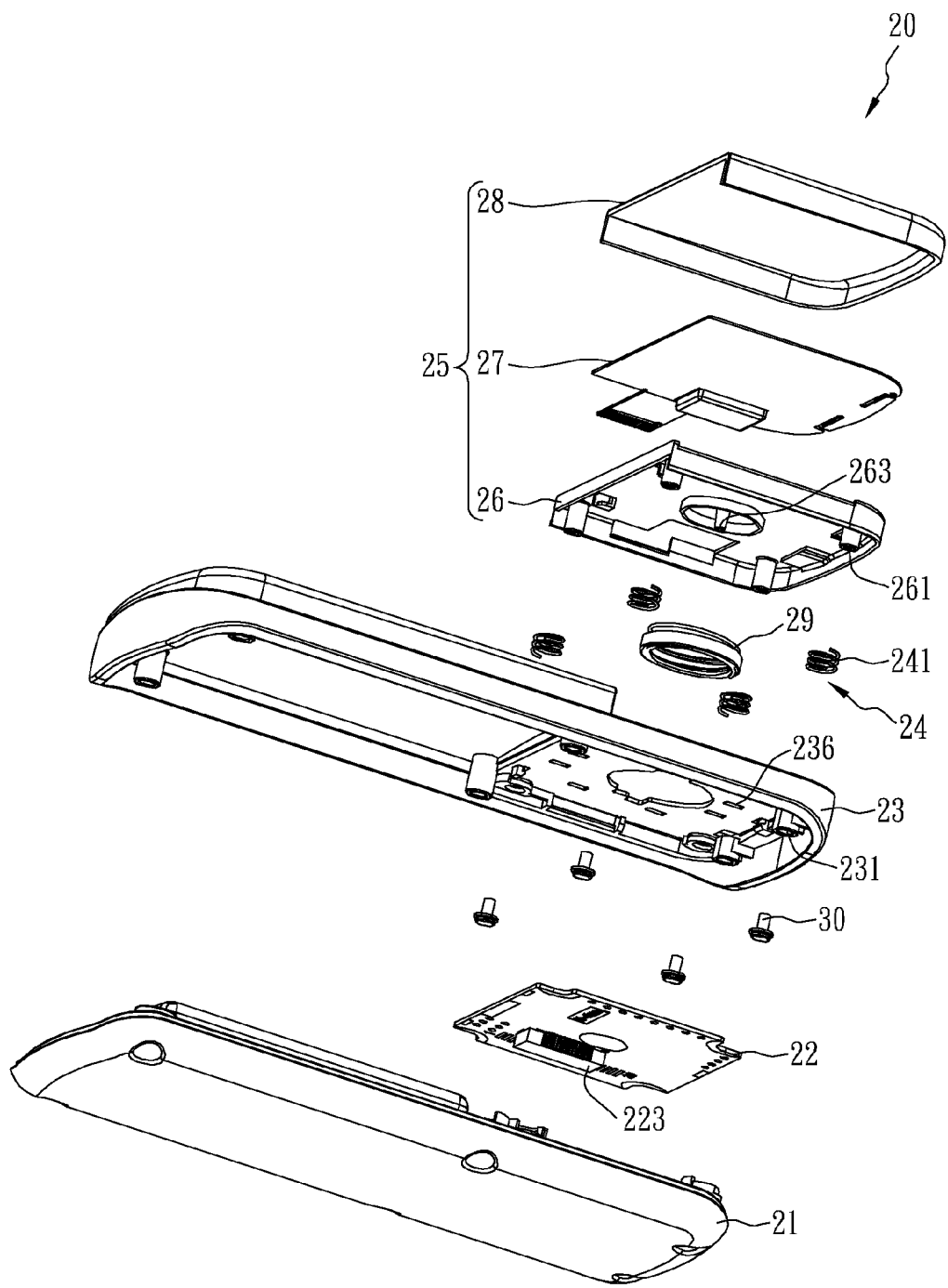

FIG. 1 and FIG. 2 illustrate a handheld electronic apparatus in accordance with a first embodiment of the present invention. A handheld electronic apparatus 10 comprises a rear cover 11, a circuit board 12, a base 13, a support mechanism 32 and a touch keypad 15. The circuit board 12 is placed between the base 13 and the rear cover 11, and the circuit board 12 is provided with a dome switch 121, e.g., a metal dome switch or a polymer dome switch, to sense pressing actions. In this embodiment, the support mechanism 32 comprises a fold frame 14 and a first spring 19. The first spring 19 is placed within the fold frame 14 and separates the base 13 and the touch keypad 15. However, the support mechanism 32 may be another mechanism as shown in FIG. 7 and FIG. 8. In this embodiment, the first spring 19 is placed between the base 13 and the touch keypad 15. When the touch keypad 15 is pressed, the first spring 19 will be compressed. When the user's hand is removed from the touch keypad 15, the touch keypad 15 will be pushed back by the first spring 19 and returned to its original status. The base 13 has a first opening 133 corresponding to the dome switch 121, the first spring 19 and the fold frame 14. Therefore, the touch keypad 15 can trigger the dome switch 121 through the first opening 133.

Figure 3:
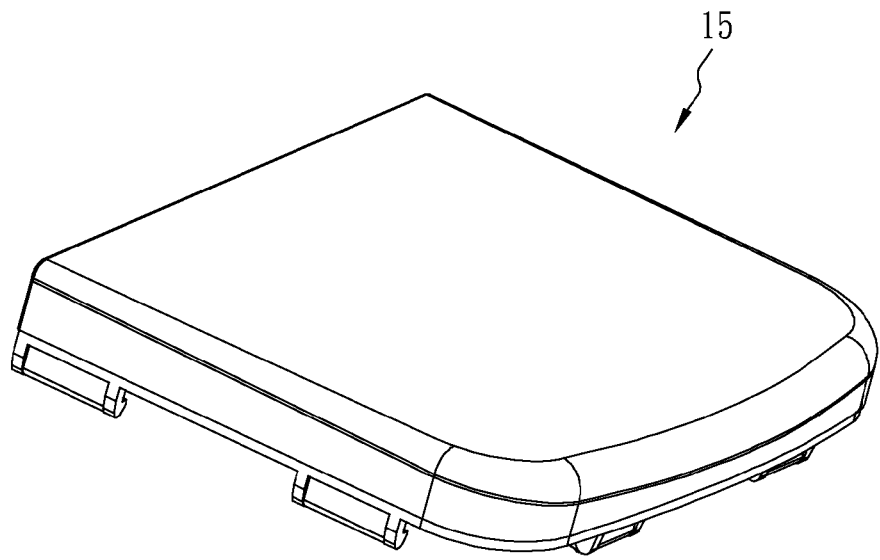
FIG. 3 is a perspective view of the assembled touch keypad of the handheld electronic apparatus in accordance with the first embodiment of the present invention.

In this embodiment, the touch keypad 15 comprises a support frame 16, a capacitor sensing element 17 and a front cover 18, which are modularized to form the touch keypad 15 as shown in FIG. 3. The support frame 16 has a plunger 163 on the bottom surface thereof. When the user presses the front cover 18 of the touch keypad 15 to input the instructions, the plunger 163 goes through the first opening 133 and the first spring 19 to press the dome switch 121 on the circuit board 12. However, the touch keypad 15 may be composed of other components so that signals can be transmitted when the user touches the touch keypad 15.

In this embodiment, the support frame 16 may comprise a plurality of hooks 162 placed on the bottom surface thereof, and the base 13 has multiple fourth openings 135. The hooks 162 are secured to the base 13 through the fourth openings 135. Consequently, when the touch keypad 15 is pushed back by the first spring 19, the hooks 162 can hook the base 13 to limit the movement range of the touch keypad 15. The mechanism to limit the movement range of the touch keypad 15 may be those shown in FIG. 7 and FIG. 8.

In this embodiment, the circuit board 12 comprises a connector 123 placed on the bottom surface of the circuit board 12. The base 13 has a second opening 134, and the support frame 16 has a third opening 164, and the capacitor sensing element 17 comprises a connecting portion 171. The connecting portion 171 is connected to the connector 123 through the third opening 164 and the second opening 134. Therefore, when the user touches the touch keypad 15, the signal can be transmitted to the circuit board 12 through the connecting portion 171 and the connector 123. In addition, the signal of the touch keypad 15 can also be transmitted to the corresponding electronic devices (not shown) by wireless or other manners. The operation of the handheld electronic apparatus 10 is as explained below.

When the user touches the icon on the front cover 18 corresponding to a desired input instruction, the capacitor sensing element 17 detects the input and the detected signals are transmitted to the microprocessor (not shown) in the base 13 to determine which function or operation will be performed. At this time, the user also presses down the touch keypad 15 so as to press the touch dome switch 121. As a result, the dome switch 121 sends a signal to the microprocessor. When the microprocessor receives the signal from the capacitor sensing element 17 and the signal from the dome switch 121, the microprocessor performs some specific functions or operations. Therefore, when the user accidentally touches the touch keypad 15, the handheld electronic apparatus 10 will not perform any actions, in order to reduce the likelihood of erroneous input. However, the handheld electronic apparatus 10 can perform some specific operations or functions in accordance with signals transmitted solely from the capacitor sensing element 17. The support mechanism 32 is described in detail as follows.

Figure 4:
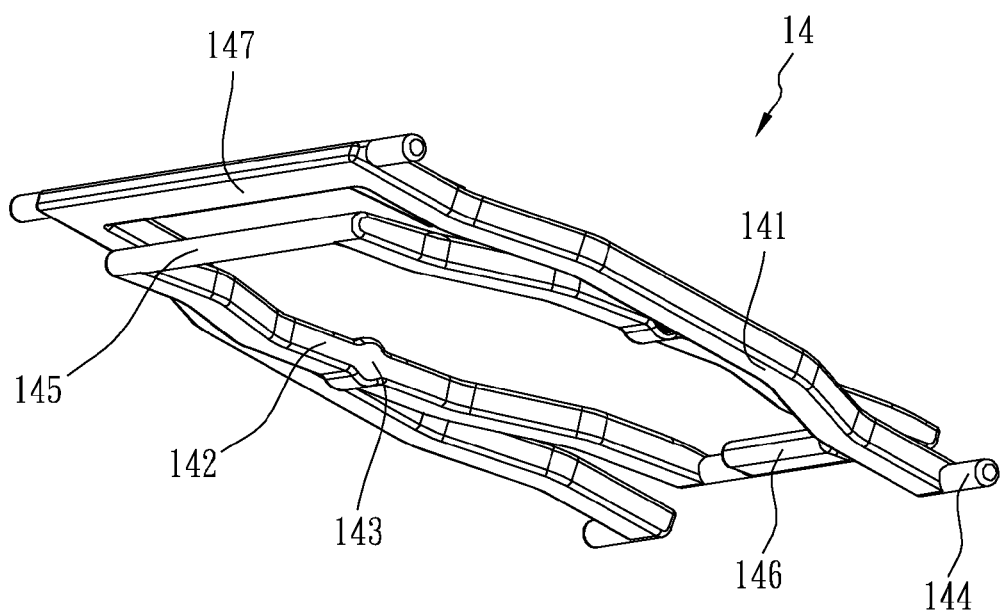
FIG. 4 is the enlarged view of the support mechanism of the handheld electronic apparatus in accordance with the first embodiment of the present invention.

FIG. 4 shows the enlarged view of the fold frame 14. In this embodiment, the fold frame 14 comprises a first frame 141 and a second frame 142, and two pivots 143 connect the middles of the longitudinal sides of the first frame 141 and the second frame 142, and therefore both sides of the first frame 141 and the second frame 142 from the pivots 143 could have equivalent lengths. In this embodiment, the first frame 141 is provided with protrusion rods 144 at one end, and the protrusion rods 144 are embedded with corresponding sockets 131 on the base 13. The second frame 142 has a transverse rod 145 at the end opposite to the protrusion rods 144, and the transverse rod 145 is configured to be secured to the corresponding first sockets 131 on the base 13. The second frame 142 is approximately a closed rectangle structure. The first frame 141 is also approximately a rectangular structure, but instead of a closed structure the end connected to the first sockets 131 is an open end.

Referring to FIGS. 2 and 4, another transverse rod 146 of the second frame 142 is embedded with the second sockets 161 at the bottom of the support frame 16. The first frame 141 is provided with a transverse rod 147 at the end opposite to the protrusion rods 144, and the transverse rod 147 is embedded with corresponding second sockets 161 at the bottom of the support frame 16. The two transverse rods 146 and 147 connected to the support mechanism 16 go up or down concurrently, so that the touch keypad 15 placed thereon will not be shaken and the stability can be improved. Moreover, the touch keypad 15 is parallel to the base 13 all the time. Even when the user touches different icons on the edge of the touch keypad 15, the touch keypad 15 will not be tilted.

Figure 5:
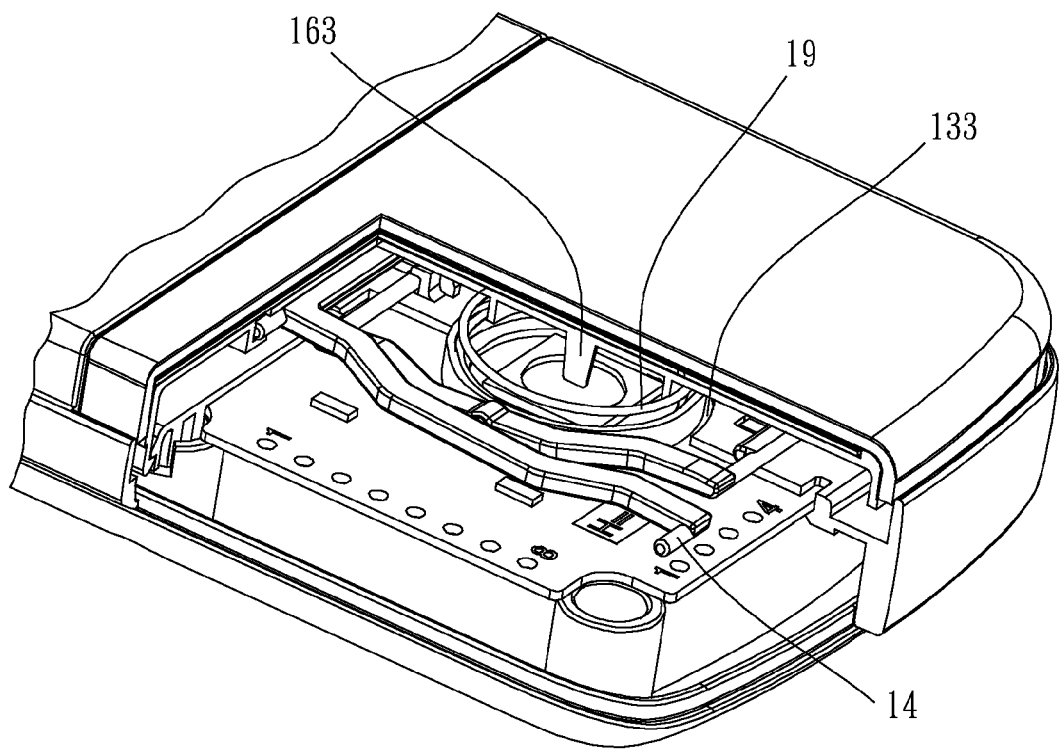
FIG. 5 is the perspective view of the handheld electronic apparatus in accordance with the present invention, wherein a portion of the handheld electronic apparatus is removed to show the interior thereof.
Figure 6:
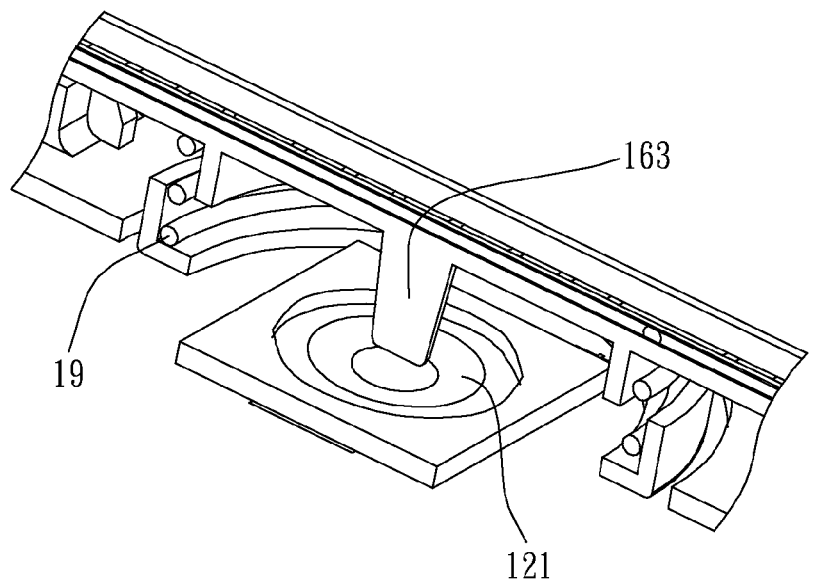
FIG. 6 is a perspective view of the handheld electronic apparatus when being pressed, wherein a portion of the handheld electronic apparatus is removed.

FIG. 5 is the perspective view of the handheld electronic apparatus 10 after assembly, wherein a portion of the handheld electronic apparatus 10 is removed. The plunger 163 goes through the first spring 19 and the fold frame 14 and corresponds to the first opening 133 located below. Referring to FIG. 6, when the user presses an icon on the touch keypad 15, the plunger 163 below the support mechanism 16 goes down to press the dome switch 121. For a metal dome switch, the dome is deformed when being pressed, and dome switch 121 will return to its original status when the pressure on the touch keypad 15 is released, thereby providing tactile feedback to the user.

Second Embodiment

FIG. 7 illustrates the exploded perspective view of the handheld electronic apparatus 20 in accordance with the second embodiment of the present invention, whereas FIG. 8 illustrates the exploded perspective view of the handheld electronic apparatus 20 in accordance with the second embodiment of the present invention with another view angle. This embodiment is similar with the first embodiment except for differences in the support mechanism 24 and the touch keypad 25. Specifically, the handheld electronic apparatus 20 comprises a rear cover 21, a circuit board 22, a base 23, a support mechanism 24 and a touch keypad 25. The circuit board 22 is placed between the rear cover 21 and the base 23, and comprises a dome switch 221 providing tactile feedback. In this embodiment, the support mechanism 24 comprises a second spring 29 and a plurality of third springs 241. The second spring 29 is placed above the dome switch 221 and separates the base 23 and the touch keypad 25. The second spring 29 is configured to push the touch keypad 25 back. The third springs 241 are placed around the second spring 29 and separate the base 23 and the touch keypad 25. The third springs 241 are configured to keep the base 23 and the touch keypad 25 in parallel.

The touch keypad 25 comprises a support frame 26, a capacitor sensing element 27 and a front cover 28, which are modularized to form the touch keypad 25. Likewise, the support frame 26 comprises a plunger 263 on the bottom thereof penetrating through the second spring 29. The circuit board 22 has a connector 223 on the bottom surface thereof, and the capacitor sensing element 27 is assembled to the connector 223 through the support frame 26 and the base 23. In comparison with the fold frame of the first embodiment, the support mechanism 24 is constituted of springs. Four screws 30 penetrate multiple fifth openings 231 of the base 23 and the third springs 241 and are secured to screw holes 261 on the bottom surface of the support frame 26. Because the springs 241 provide substantially equal spring forces, the touch keypad 25 can be kept in parallel or horizontal to the base 23.

In order to recognize the icons on the touch keypad 25, the handheld electronic apparatus 20 further comprises a plurality of lighting devices 222 placed on the circuit board 22. The lighting devices 222 are exposed through multiple sixth openings 236 of the base 23. Accordingly, the lighting devices 222 can emit lights through the sixth openings 236 and the touch keypad 25 in sequence to the user's eyes. In an embodiment, the lighting devices 236 can be light emitting diodes (LED), organic light emitting diodes (OLED), electroluminescence (EL) elements, organic electroluminescence (OEL) elements or the like.

Likewise, the handheld electronic apparatus 10 of the first embodiment may comprise a plurality of lighting devices 122 on the circuit board 12. The base 13 has multiple sixth openings 136 exposing the lighting devices 122. Accordingly, the lighting devices 122 can emit lights through the sixth openings 136 and the touch keypad 25 in sequence to the user's eyes.

The above-mentioned fold frame or springs are examples of the present invention; other alternative mechanisms, devices or apparatuses also can be used and covered by the scope of the present invention.

According to the present invention, when the user touches any icon on the touch keypad, the deformation and recovery of the dome switch generate tactile feedback like that provided by traditional keys. Moreover, although varied locations of different icons, e.g., the icons far away from the center of the touch keypad, may generate torque to the touch keypad, the touch keypad still can remain horizontal and stable through the support mechanism and avoid being tilted.

The above-described embodiments of the present invention are intended to be illustrative only. Numerous alternative embodiments may be devised by those skilled in the art without departing from the scope of the following claims.

What is claimed is:

1. A handheld electronic apparatus, comprising:
   a touch keypad having a plurality of icons configured to detect a user's touch action, wherein the touch keypad includes:
   a front cover comprising a plurality of icons;
   a capacitor sensing element placed below the front cover and electrically connected to a circuit board, wherein the capacitor sensing element is configured to sense the touch action; and
   a support frame placed below the capacitor sensing element and comprising a plunger on the bottom surface thereof, wherein the plunger presses a dome switch through a first opening when the user presses the front cover;
   a circuit board comprising a dome switch and being placed below the touch keypad, wherein the touch keypad is suitable for moving to press the dome switch, wherein the circuit board further comprises a connector, a base has a second opening and the support frame has a third opening, the capacitor sensing element has a connection portion penetrating through the third opening and the second opening to be connected to the connector;
   a base placed between the touch keypad and the circuit board and having a first opening, wherein the touch keypad can press the dome switch through the first opening; and
   a support mechanism placed between the base and the touch keypad and configured to support the touch keypad.

2. The handheld electronic apparatus of claim 1, wherein the support mechanism comprises: a fold frame comprising a first frame, a second frame and two pivots, the two pivots connecting the centers of the longitudinal sides of the first frame and the second frame; and a first spring placed inside the fold frame and separating the base and the touch keypad, wherein the plunger penetrates the first spring.

3. The handheld electronic apparatus of claim 2, wherein the base further comprises a plurality of first sockets configured to secure ends of the first frame and the second frame, and the support frame comprises a plurality of second sockets configured to secure the other ends of the first frame and the second frame.

4. The handheld electronic apparatus of claim 1, wherein the support frame comprises a plurality of hooks on the bottom surface thereof, the base has a plurality of fourth openings, and the hooks are secured to the base through the fourth openings.

5. The handheld electronic apparatus of claim 1, wherein the support frame comprises: a second spring placed above the dome switch and separating the base and the touch keypad, wherein the plunger penetrates through the second spring; and a plurality of third springs placed around the second spring and separating the base and the touch keypad.

6. The handheld electronic apparatus of claim 5, further comprising a plurality of screws, wherein the base has a plurality of fifth openings, the support frame is provided with a plurality of screw holes on the bottom surface thereof and the plurality of screws go through the fifth openings and the third springs to be secured to the screw holes.

7. The handheld electronic apparatus of claim 1, further comprising a plurality of lighting devices placed on the circuit board, and the base has a plurality of sixth openings exposing the lighting devices.

8. The handheld electronic apparatus of claim 1, wherein the dome switch is a metal dome switch or a polymer dome switch.

9. The handheld electronic apparatus of claim 1, further comprising a rear cover, wherein the circuit board is placed between the base and the rear cover.

10. An input device for a handheld electronic apparatus, wherein the handheld electronic apparatus has a base with a first opening, the input device comprising:
    a touch keypad having a plurality of icons configured to detect a user's touch action, wherein the touch keypad includes:
    a front cover comprising a plurality of icons;
    a capacitor sensing element placed below the front cover and electrically connected to a circuit board, wherein the capacitor sensing element is configured to sense the touch action; and
    a support frame placed below the capacitor sensing element and comprising a plunger on the bottom surface thereof, wherein the plunger presses a dome switch through the first opening when the user presses the front cover;
    a circuit board comprising a dome switch and being placed below the touch keypad, wherein the touch keypad is suitable for moving to press the dome switch, the base is placed between the touch keypad and the circuit board, and the touch keypad can press the dome switch through the first opening, wherein the circuit board further comprises a connector, the base has a second opening and the support frame has a third opening, the capacitor sensing element has a connection portion penetrating through the third opening and the second opening to be connected to the connector; and
    a support mechanism placed between the base and the touch keypad and configured to support the touch keypad.

11. The input device of claim 10, wherein the support mechanism comprises: a fold frame comprising a first frame, a second frame and two pivots, the two pivots connecting the centers of the longitudinal sides of the first frame and the second frame; and a first spring placed inside the fold frame and separating the base and the touch keypad, wherein the plunger penetrates the first spring.

12. The input device of claim 11, wherein the base further comprises a plurality of first sockets configured to secure ends of the first frame and the second frame, and the support frame comprises a plurality of second sockets configured to secure the other ends of the first frame and the second frame.

13. The input device of claim 10, wherein the support frame comprises a plurality of hooks on the bottom surface thereof, the base has a plurality of fourth openings, and the hooks are secured to the base through the fourth openings 14. The input device of claim 10, wherein the support frame comprises: a second spring placed above the dome switch and separating the base and the touch keypad, wherein the plunger penetrates through the second spring; and a plurality of third springs placed around the second spring and separating the base and the touch keypad.

15. The input device of claim 14, wherein the handheld electronic apparatus further comprising a plurality of screws, and the base has a plurality of fifth openings, the support frame is provided with a plurality of screw holes on the bottom surface thereof, and the plurality of screws go through the fifth openings and the third springs to be secured to the screw holes.

16. The input device of claim 10, wherein the handheld electronic apparatus further a plurality of lighting devices placed on the circuit board, and the base has a plurality of sixth openings exposing the lighting devices.

* * * * *